July 5, 1949.　　　M. E. GLUHAREFF　　　2,475,318
ROTOR
Filed Feb. 2, 1945
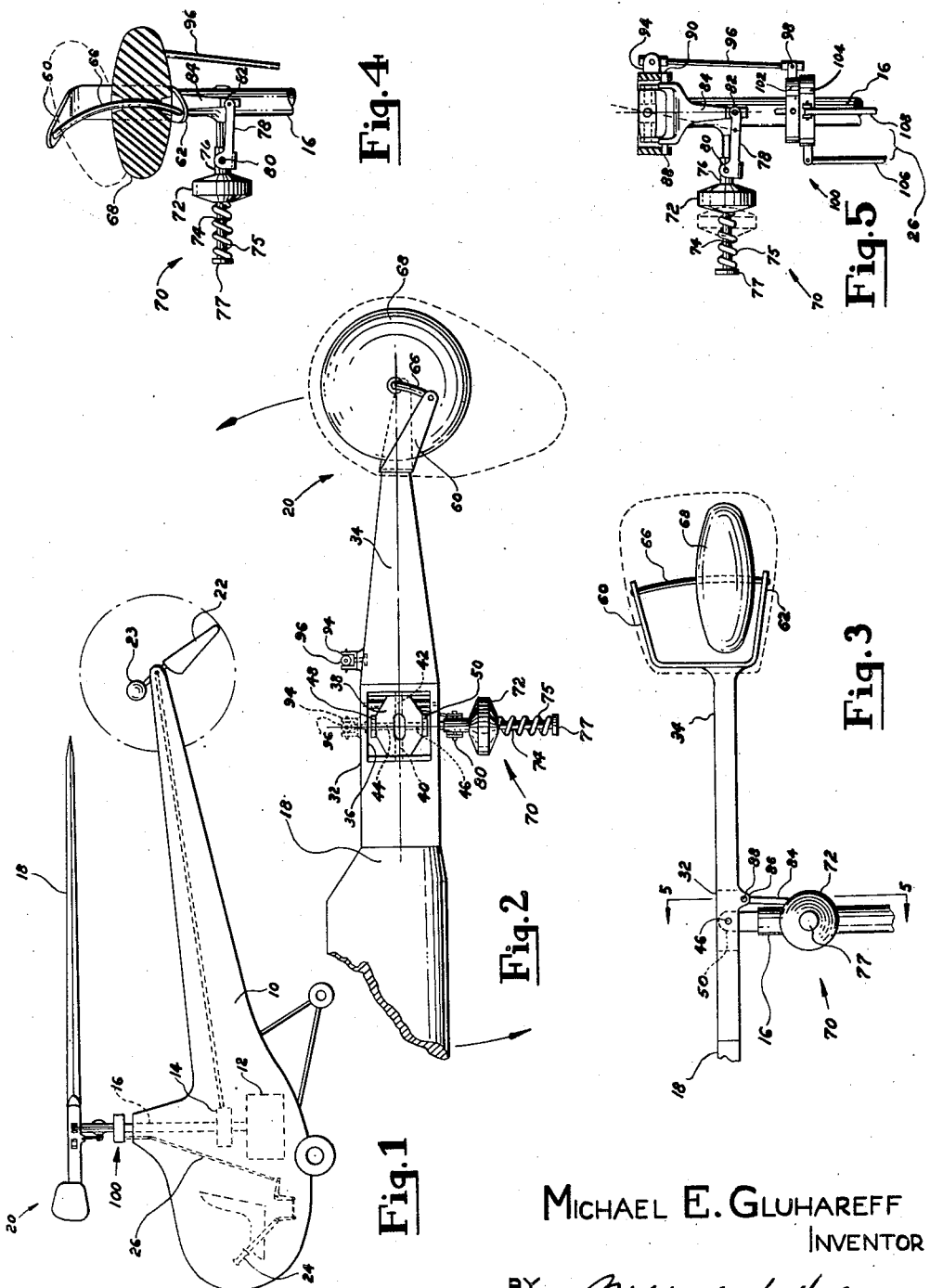
MICHAEL E. GLUHAREFF
INVENTOR
BY *Difford S. Holm*
AGENT Patented July 5, 1949

2,475,318

UNITED STATES PATENT OFFICE 2,475,318

ROTOR

Michael E. Gluhareff, Stratford, Conn., assignor to United Aircraft Corporation, East Hartford, Conn., a corporation of Delaware Application February 2, 1945, Serial No. 575,896

16 Claims. (Cl. 170—160.26)

The present invention relates to helicopters, and more particularly to rotor blades for sustaining and/or propelling such aircraft.

Specifically, my invention comprises an improved single bladed sustaining rotor including static and dynamic counterbalancing means for compensating the effects of drag upon the rotor, and the mass thereof.

Heretofore, counterbalanced rotors have been proposed. Some of these used fixed weights arranged on the side of the driving shaft opposite the blade. Such rotors cannot automatically compensate for the drag effects. Other rotors have used counterweights arranged at an angle to the centerline of the rotor blade to offset drag. These rotors, by such arrangement, introduce cyclic vibrations into the system when the rotor is operating at any other speed or angle of attack than the precise speed and angle of attack for which the system is designed. Still other rotors have incorporated a pair of angularly disposed weights, one being adjustable, with an angularly hinged blade. However, with these, as the blade moves up and down in its path of movement, the counterweight system becomes out of alignment with the blade and a cyclic vibration will result. Such action also will be different for different speeds and angles of attack and coning, and proper only for one designed for set of conditions.

Therefore, it is an object of my invention to provide an improved rotor having balancing means operable to inhibit vibrations over a wide range of operating conditions for the rotor.

A further object is to arrange structure as set forth in the preceding object upon a driving shaft so that transient vibrations will have little or no appreciable effect upon the aircraft.

Other objects reside in the novel arrangement of parts, and the details of construction of my device, and will be obvious or pointed out in the following specification and claims.

In the drawing:

Fig. 1 is a diagrammatic view of an helicopter incorporating my invention in the rotor structor;

Fig. 2 is a detail plan view of the rotor head and the counterbalancing mechanism;

Fig. 3 is an elevation of the structure shown in Fig. 2;

Fig. 4 is an end view of the counterbalance mechanism with the fairing removed and the counterweight shown in section, and Fig. 5 is a sectional view taken along the line 5—5 of Fig. 3.

Referring more in detail to the drawing, in Fig. 1 a helicopter 10 has an engine 12 driving a clutch, gear and universal joint mechanism 14 for turning a relatively long and flexible shaft 16 to drive a single bladed rotor 18 having a counterweight mechanism 20 attached to the rotor mechanism on the side of the drive shaft 16 opposite the blade 18. The shaft 16 may be mounted in rubber or spring vibration dampers of known type to absorb transverse and torsional vibrations of the rotor 18. A torque reaction rotor 22 of the single blade type, counterweighted by a mass 23, is driven by the engine 12 through a shaft shown in broken lines and gearing, not shown. The rotor 22 may have more blades, if desired. A control lever 24 is provided in the cockpit to position a linkage shown diagrammatically at 26 for controlling the action of the main rotor mechanism in a manner to be described hereinafter.

In my invention, if desired, the entire rotor blade structure may be built from a single piece of material having a blade portion 18, a central portion 32 and a counterbalance portion 34. The central portion 32 has a hole 36 therein, into which a universal rotor head 38 fits. The rotor head 38 has pivots 40 and 42 therein which fit into the central portion of the blade 32 along the feathering axis thereof to provide freedom of rotation in the pitch changing direction for the rotor blade 18. A second pair of pivots 44 and 46 fit into the head 38 and are fastened pivotally into ears 48 and 50 carried upon the uppermost end of the drive shaft 16. With such universal structure, the rotor blade 18 is relatively free to flap up and down with respect to the rotor head 38 in a plane perpendicular to the axis of rotation of the shaft 16, and also to change in pitch around its longitudinal axis.

To counterweight and balance the blade 18, a counterweight mechanism 20 is provided. This mechanism is mounted on the blade portion 34 upon a fixed bracket having an upper arm 60 and a lower arm 62. A curved rod 66 is secured to the ends of the arms 60 and 62. A weight 68 is mounted upon the rod 66. As will be described hereinafter, the weight can move up and down upon the rod 66 and back and forth with respect to the centerline of the blade structure as viewed in Figs. 2 and 4, but in a manner to remain substantially in vertical alignment with said centerline when the blade portion 18 cones upwardly and simultaneously changes pitch. The rod 66, as viewed in Fig. 3 curves about a center coincident with the pin 46 of the rotor head structure 38. As viewed in Fig. 4, the curve of the rod 66 is such that as the rotor blade 18 is changed in pitch and cones upwardly (as will occur upon the application of power thereto and upon flapping of the blade 18 in flight) the weight will ride into the dotted line position, but will maintain a position that will be substantially in vertical alignment with the longitudinal axis of the blade structure as viewed in plan during the coning operation. In other words, the weight 68 is arranged upon the rod 66 so as to have substantially the same counterweighting effect for the blade 18 for all normal flight conditions of coning and pitching.

In addition to the counterweight mechanism 20, I have also provided a counterbalancing means for offsetting the effect of differences in drag caused by changing the angle of attack, or pitch, upon coning upwardly of the blade in operation. This mechanism is diagrammatically shown at 70 and comprises a weight 72 which is substantially smaller in weight than the counterweight mechanism 20, and is mounted for movement upon a shaft 74, with or against the tension of a spring 75 that abuts a retainer 77 at one end and the weight 72 at its other end. Shaft 74 has its inner end rigidly mounted in drive shaft 16 and extends therefrom at right angles to the longitudinal axis of the blade 18. A collar 76 is secured to the weight 72 and is likewise slidable upon the rod 74. A link 78 is pivotally connected to the collar 76 by a pin 80 at one of its ends and connected to a universal connection 82 at its other end. This universal connection 82 is carried by a link 84 which is connected to a bracket 86 secured to the under side of the rotor blade by pivot pins 88 and 90, as best shown in Fig. 5. A universal pivot bracket 94 is secured to the edge of the blade structure. In Fig. 2, this bracket 94 is shown in dotted lines in a second position, and it is to be understood that the pivot bracket 94 may be secured at intermediate positions between these two positions or at other positions, for purposes to be pointed out hereinafter.

A link 96 is connected to the universal pivot bracket 94 at one of its ends and to a second pivot bracket 98 at the other of its ends. The second pivot bracket 98 is mounted upon a control mechanism indicated by the reference character 100, comprising a pair of collars 102 and 104 connected together by rotatable bearing means, not shown. The collar 104 is arranged to be moved up and down and also tilted, if desired, by control rods 106 and 108. The details of the control structure have not been shown and will not be described except that it is to be noted that as the control rods 106 and 108 are moved together in the same direction with respect to the rotor head 38, the total pitch, or angle of attack, of the rotor blade 18 will be changed. As the rod 106 is moved relatively to the rod 108, the blade 18 will be pitched differently in different portions of its cycle.

The mechanism 70 is adapted in operation to offset and dynamically counterbalance the effect of drag that acts upon the rotor blade 18. When the rotor blade is turning, a centrifugal force is generated in the rotor blade that acts directly outward from the hub 38. The effect of the counterweight mechanism 20 will be to offset this centrifugal force by an equal and opposite centrifugal force. However, as the blade 18 impinges upon the air, a drag component will act upon the rotor mechanism to impress a force, parallel to the drag, upon the rotor shaft 16. If this force is not counteracted or counterbalanced with a single rotor blade, a cyclic oscillation will occur with each revolution of the rotor. The mechanism 70, however, exerts a centrifugal force which is directly opposed to this drag effect, and for a given setting of the angle of attack of the rotor blade 18 will exert a centrifugal force counteracting and counterbalancing this drag effect upon the rotor shaft 16. Small vibrations that may remain are taken up by the flexibility of the drive shaft 16, which may be mounted in soft rubber supports or floating bearings, and therefore not transferred to the body of the craft.

As the angle of attack of the rotor blade is changed by shifting the control rods 106 and 108 downwardly, for example, the trailing edge of the rotor blade 18 will be moved downwardly by the link 96 through the pivot 94. Concurrently with this action, the link 84 mounted upon the lower side of the blade will be rocked in a clockwise direction (as viewed in Fig. 5) to move the weight 72 out toward the dotted line position against the compression of the spring 75 which bears upon the retainer 77 carried by the rod 74. Because the weight 72 is farther from the center of rotation when the angle of attack of the rotor blade 18 is increased, the centrifugal force exerted by the weight 72 in this position will offset and oppose the increased drag effect upon the shaft 16 caused by the increase in angle of attack.

In operating my device, it will be found that under different power inputs, different atmospheric conditions encountered in flight, and gusts of wind, there will be a flapping action of the rotor 18. By suitably positioning the pivot bracket 94 to the solid line position shown in Fig. 2, a pitch reducing movement can be provided for the mechanism to cause the angle of attack to be decreased when upward coning occurs, and the links 78 and 84 will pull the weight 72 toward the shaft 16. In most instances this pulling in of the weight 72 will occur when the rotor blade is increasing in lift and hence increasing its drag. At this time an increased drag component will be acting upon the shaft 16. However, because the weight 72 will have an initial centrifugal force acting thereon and will, in addition thereto, have a reaction force due to the moving in of the weight upon a coning up movement, these forces may be selected to offset the increased drag by properly selecting the weight 72, the spring 75, the associated operating linkage, and positioning the pivot connection 94.

It will be noted in Fig. 5 that when the weight 72 is in its outward (dotted) position and coning occurs, the pitch of the blade will decrease as it rocks around the universal head 38 and the connection 94, and hence the path of the pivot connection 82 will be downwardly and toward the right. This action will also tend to increase the acceleration of the weight 72 toward the shaft 16 in cooperation with the force of the spring 75; and the effect upon the shaft 16 will be a reaction force equal and opposite to such acceleration.

It is obvious that as more or less automatic pitch reduction is desired upon coning, the pivot bracket 94 can be shifted to different positions. It is also apparent that the bracket 86 mounting the link 84 could also be shifted to augment or subtract from the action of the link 96 upon coning of the blade 18. Furthermore, different counterweight arrangements than the specific embodiment shown could be used.

In the description above, separate forces due to actions of the weight 72 and the counterweight 68 have been referred to. However, the separable forces of the two can be resolved into a single component of force that acts at an angle to each of them. Obviously, more or less than two weights can have a resultant effect for accomplishing the same net function. Hence, I wish not to be limited in my invention only to that form shown and described but by the scope of the following claims.

I claim:

1. A rotor comprising, an elongated blade having end portions and an intermediate shank portion, one of said end portions being formed into an airfoil, a counterweight, counterweight mounting means on the other end portion, said means having a portion mounting said counterweight permitting shifting of the same when said blade changes position; a flexible torque transmission shaft for turning said blade, a universal connection between said shaft and said blade in the shank portion of the blade, a movable weight connected to said shaft at an angle to the longitudinal axis of said blade for counteracting drag forces of said blade upon said shaft, and manually adjustable means connecting said blade and said weight for moving the weight and the blade simultaneously to automatically vary the effective combined position of counterbalance of said counterweight and said weight.

2. A rotor blade as set forth in claim 1 wherein the mass of the weight is less than the mass of the counterweight.

3. A rotor blade as set forth in claim 1 wherein said angle is substantially 90° from the longitudinal axis of the blade.

4. A rotor comprising, an elongated blade having end portions and an intermediate shank portion, at least one of said end portions being formed into an airfoil, a counterweight, counterweight mounting means on the other end portion; a torque transmission shaft for turning said blade, a pivot connection between said shaft and said blade in the shank portion of the blade, a movable weight connected to said shaft at an angle to the longitudinal axis of said blade for counteracting drag forces of said blade upon said shaft, and means connecting said blade and said weight for moving the weight and the blade simultaneously to automatically vary the effective combined position of counterbalance of said counterweight and said weight.

5. A rotor blade as set forth in claim 4 wherein the mass of the weight is less than the mass of the counterweight.

6. A rotor blade as set forth in claim 4 wherein said angle is substantially 90° from the axis of the blade.

7. A rotor comprising in combination, an elongated blade having end portions and an intermediate shank portion, one of said end portions being formed into an airfoil, a counterweight, counterweight mounting means on the other end portion, said means having a curved portion forming a guide for mounting said counterweight upon which the counterweight can move when said blade changes position in coning or flapping sense, a torque transmission shaft for turning said blade, said blade being mounted for pitch changes, a coning or flapping pivot connection between said shaft and said blade in the shank portion of the blade, a movable weight connected to said shaft at substantially a 90° angle to the longitudinal axis of said blade, said weight having a smaller mass than said counterweight, and means connecting said blade and said weight for shifting the weight when the blade changes position to automatically vary the effective combined position of counterbalance of said counterweight and said weight.

8. In a rotor comprising structure having a single blade portion and a shank portion operatively connected to a drive shaft, the combination of, a counterweight for said blade portion, mounting means for said counterweight permitting shifting of the counterweight when the blade changes position, a weight movably connected with said shaft, and manual means for controlling the position of said blade.

9. In aircraft, a drive shaft having an axis of rotation lying in a plane, mounting means connected to said shaft by a first pivot substantially normal to said plane and having a second pivot lying substantially in said plane, a blade mounted for feathering upon said second pivot and for flapping upon said first pivot, a counterweight for said blade, and means connected to said blade for retaining the center of gravity of said counterweight substantially in said plane upon flapping and feathering of said blade, comprising a curved rod passing through the center of gravity of said counterweight, said counterweight being slidably mounted upon said rod.

10. With an elongated single bladed counterweighted rotor mounted upon a shaft upon pivots for pitch changing and flapping, the combination of control means for changing pitch thereof cylindrically and totally connected to said blade so that flapping movements will cause pitch changes, a weight mounted on said shaft and radially movable at an angle to the longitudinal axis of said blade for counteracting drag forces of said blade upon said shaft, and operating connections between said control means and said weight for causing said weight to move radially to dynamically balance transient drag forces caused by cyclic control and flapping of said blade and statically balance changes in total pitch.

11. With an elongated single bladed counterweighted rotor mounted upon a shaft upon pivots for pitch changing and flapping, the combination of control means for cyclically changing the pitch thereof connected to said blade so flapping movements will cause pitch changes, a weight carried by said shaft and adapted for radial movement at a right angle to the longitudinal axis of said blade for counteracting drag forces of said blade upon said shaft, and operating connections between said control means and said weight for causing said weight to move radially to dynamically balance transient drag forces caused by flapping of said blade.

12. In a rotor, in combination, a drive shaft, a single blade having a shank portion pivotally connected to said shaft for flapping and pitch changing movements, a radially movable weight connected to said shaft at an angle to the longitudinal axis of said blade, means for automatically moving said weight in response to pitch changing movements of said blade, a movable counterweight connected to said shank opposite said blade, and means for maintaining a constant distance between said counterweight and said shaft during flapping movements and for retaining the center of gravity of said counterweight in substantially the same plane as said shaft during pitch changing movements.

13. In a helicopter rotor, a drive shaft, a single blade having a shank portion pivotally connected to said drive shaft for flapping and pitch changing movements, a counterweight for said blade mounted on said shank portion on the opposite side of said shaft from said blade, mechanism operative to balance the unbalanced rotational drag forces acting on the rotor including a weight slidably mounted on a support at one side of the longitudinal axis of said blade, and means operatively connecting said blade and said weight for adjusting said weight radially on said support and at an angle to said blade axis in response to pitch changing movements of said blade to vary the balancing effect of said weight and balance said unbalanced drag forces for different pitch adjustments of said blade.

14. In a helicopter rotor, a drive shaft, a single blade having a shank portion pivotally connected to said drive shaft for flapping and pitch changing movements, a counterweight for said blade mounted on said shank portion on the opposite side of said shaft from said blade, and mechanism operative to balance the unbalanced rotational drag forces acting on the rotor including a weight mounted on said shaft and radially movable at an angle to the longitudinal axis of said blade, and means operatively connecting said weight and blade for effecting radial movement of said weight toward and away from said blade axis in response to changes in blade pitch.

15. In a helicopter rotor, a drive shaft, a single blade having a shank portion pivotally connected to said drive shaft for flapping and pitch changing movements, a counterweight for said blade mounted on said shank portion on the opposite side of said shaft from said blade, mechanism operative to balance the unbalanced rotational drag forces acting on the rotor including a weight mounted at one side of the longitudinal axis of said blade and movable radially at an angle to said axis, manually operable means for changing the pitch of said blades, and an operative connection between said blade and said weight for automatically adjusting the latter radially in accordance with changes in blade pitch to vary the balancing effect of said weight and compensate for the change in the unbalanced drag of the rotor due to changes in pitch of said blade.

16. In a helicopter rotor, a drive shaft, a single blade having a shank portion pivotally connected to said drive shaft for flapping and pitch changing movements, a counterweight for said blade mounted on said shank portion on the opposite side of said shaft from said blade, and mechanism operative to balance the unbalanced rotational drag forces acting on the rotor including a radial shaft carried by said drive shaft and extending therefrom at an angle to the longitudinal axis of said blade, an abutment adjacent the free end of said radial shaft, a weight slidably mounted on said radial shaft, resilient means between said abutment and said weight for urging the latter toward said drive shaft, and means operatively connecting said weight to said blade for effecting movement of said weight toward and from said drive shaft in response to pitch changes of said blade.

MICHAEL E. GLUHAREFF.

REFERENCES CITED

The following references are of record in the file of this patent:

UNITED STATES PATENTS

| Number | Name | Date |
|---|---|---|
| 1,036,122 | Kellogg | Aug. 20, 1912 |
| 1,482,690 | Lanzius | Feb. 5, 1924 |
| 1,761,690 | Steinmetz | June 3, 1930 |
| 2,071,513 | Everts | Feb. 23, 1937 |
| 2,124,369 | Everts | July 19, 1938 |
| 2,297,815 | Tidd | Oct. 6, 1942 |
| 2,368,698 | Young | Feb. 6, 1945 |

Certificate of Correction

Patent No. 2,475,318. July 5, 1949.

MICHAEL E. GLUHAREFF

It is hereby certified that error appears in the printed specification of the above numbered patent requiring correction as follows:

Column 6, line 31, claim 10, for "cylindrically" read *cyclically*;

and that the said Letters Patent should be read with this correction therein that the same may conform to the record of the case in the Patent Office.

Signed and sealed this 22nd day of November, A. D. 1949.

[SEAL]

THOMAS F. MURPHY,
*Assistant Commissioner of Patents.*